US011782736B2

(12) United States Patent
Ranganaboina et al.

(10) Patent No.: US 11,782,736 B2
(45) Date of Patent: Oct. 10, 2023

(54) SYSTEM AND METHOD FOR IMPLEMENTING AN ATTENDED AUTOMATION MODULE

(71) Applicant: JPMorgan Chase Bank, N.A., New York, NY (US)

(72) Inventors: Sridhar Ranganaboina, Mirdoddi (IN); Arvind Bhanushali, Houston, TX (US); Rajya Kotamraju, Hyderabad (IN); Raghu Narahari, Hyderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/646,206

(22) Filed: Dec. 28, 2021

(65) Prior Publication Data
US 2023/0142070 A1     May 11, 2023

(30) Foreign Application Priority Data
Nov. 5, 2021    (IN) .............................. 202111050801

(51) Int. Cl.
*G06F 9/451*        (2018.01)
*G06F 9/54*         (2006.01)
(Continued)

(52) U.S. Cl.
CPC ................ *G06F 9/451* (2018.02); *G06F 3/14* (2013.01); *G06F 9/543* (2013.01); *G06F 3/04817* (2013.01)

(58) Field of Classification Search
CPC . G06F 9/451; G06F 3/14; G06F 9/543; G06F 3/04817
See application file for complete search history.

(56) References Cited

U.S. PATENT DOCUMENTS

2008/0144603 A1*   6/2008   Chouksey ........... H04L 65/4015
                                                               370/352
2010/0024036 A1    1/2010   Morozov et al.
(Continued)

OTHER PUBLICATIONS

Official Communication Received in PCT Application No. PCT/US2022/48689, dated Feb. 22, 2023.

*Primary Examiner* — Jennifer N Welch
*Assistant Examiner* — Kuang F Chen
(74) *Attorney, Agent, or Firm* — Greenblum & Bernstein, P.L.C.

(57) ABSTRACT

Various methods, apparatuses/systems, and media for implementing an attended automation module are disclosed. A processor implements a primary desktop on a graphical user interface (GUI) window. The primary desktop is being created in response to calling a higher level application programming interface (API) from a higher level library in connection with a primary desktop session. The processor also determines that a primary session is being conducted on the primary desktop; accesses a lower level library that stores lower level APIs; calls the lower level APIs; dynamically creates, in response to calling the lower level APIs, a plurality of child desktops each associated with a corresponding lower level API; displays the plurality of child desktops on the GUI window; and simultaneously runs each of the plurality of child desktops on the GUI window in parallel independent of running of the primary desktop.

18 Claims, 8 Drawing Sheets

(51) Int. Cl.
*G06F 3/14* (2006.01)
*G06F 3/04817* (2022.01)

(56) References Cited

U.S. PATENT DOCUMENTS

| | | |
|---|---|---|
| 2013/0067100 A1 | 3/2013 | Kuzin et al. |
| 2016/0259717 A1* | 9/2016 | Nychis ................ G06F 9/45508 |
| 2017/0213520 A1* | 7/2017 | Kim .................... G06F 3/04883 |
| 2020/0210237 A1* | 7/2020 | Saraf ....................... A63F 13/67 |
| 2021/0258389 A1* | 8/2021 | Hall ...................... H04L 67/146 |
| 2022/0012152 A1* | 1/2022 | Dines .................. G06F 11/3409 |

* cited by examiner

SYSTEM AND METHOD FOR IMPLEMENTING AN ATTENDED AUTOMATION MODULE

CROSS-REFERENCE TO RELATED APPLICATIONS

This application claims the benefit of priority from Indian Provisional Patent Application No. 202111050801, filed Nov. 5, 2021, which is herein incorporated by reference in its entirety.

TECHNICAL FIELD

This disclosure generally relates to multiple concurrent attended software robots (bots) solution, and, more particularly, to methods and apparatuses for implementing an attended automation module configured for creating additional sessions (i.e., multiple desktops) availability to run attended bots in parallel to their primary desktop.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Applications typically require infrastructure resources such as servers, databases, load balancers, message queues, storages etc. in order to function. Typically, these infrastructure resources need to be provided at the time of application startup. Modern applications may need to access a number of infrastructure resources in order to provide useful functionality. For example, the need to have the desktops availability to end users while the focus demanding applications are being used by the attended bots. Critical example may be the attended bot deployments for contact center executives that may need to use their desktops to note certain details about customer while the attended bot retrieves the required customer details from multiple data sources. Typically, attended bots run on a user's desktop. While the bots are running, users may not carry on other activities because the bots may be utilizing a user's keyboard, mouse, and screen resources, etc., resulting inefficient work session where a user may only watch the bots' activities.

Thus, there is a need for an advanced tool that can solve the above problems associated with conventional approach of attended bots.

SUMMARY

The present disclosure, through one or more of its various aspects, embodiments, and/or specific features or sub-components, provides, among other features, various systems, servers, devices, methods, media, programs, and platforms for implementing an attended automation module configured for creating additional sessions (i.e., multiple child or secondary desktops) for running attended bots in parallel to their primary desktop without requiring system privileges or changes, but the disclosure is not limited thereto.

For example, the present disclosure, through one or more of its various aspects, embodiments, and/or specific features or sub-components, provides, among other features, various systems, servers, devices, methods, media, programs, and platforms for implementing an attended automation module that can implement the following functionalities, but the disclosure is not limited thereto: configuring a plurality of independent desktops for attended bots (i.e., child or secondary desktops) within a primary desktop that allows users to run attended bots in the plurality of independent spaces; implementing the plurality of independent desktops (i.e., spaces) in a manner such that the users can continue to run a session on the primary desktop and toggle between the plurality of independent spaces; implementing multiple independent spaces in a manner such that more than one bot can run in parallel while users are working; executing image based, Web, Windows Applications, Office suite, Citrix, Desktop, and Adobe Flash based automations without disruption to user activities; providing flexibility to handle up to three, but the disclosure is not limited to three, robotic desktop automation (RDA) bots at a time on a single user machine; enabling integration and execution of other automation scripts/tools with RDA bots, etc. Attended bots may run actions requiring user application focus via screen based actions, mouse control, and keyboard actions. According to a further aspect of the present disclosure, through one or more of its various aspects, embodiments, and/or specific features or sub-components, provides, among other features, various systems, servers, devices, methods, media, programs, and platforms for creating multiple independent desktops allowing bots to run such interactive actions in the child sessions while users continue to work normally in the primary desktop.

According to an aspect of the present disclosure, a method for implementing an attended automation module by utilizing one or more processors and one or more memories is disclosed. The method may include: implementing a primary desktop on a graphical user interface (GUI) window, wherein the primary desktop is created in response to calling a higher level application programming interface (API) from a higher level library in connection with a primary desktop session; determining that a primary session is being conducted on the primary desktop; accessing, in response to determining that the primary session is being conducted on the primary desktop, a lower level library that stores lower level APIs; calling the lower level desktop APIs; dynamically creating, in response to calling the lower level APIs, a plurality of child desktops each associated with a corresponding lower level API; displaying the plurality of child desktops on the GUI window; and simultaneously running each of the plurality of child desktops on the GUI window in parallel independent of running of the primary desktop.

According to yet another aspect of the instant disclosure, the higher level library and the lower level library may correspond to system level application access, and wherein a lower level API may include more detailed functionalities corresponding to an application compared to a higher level API.

According to a further aspect of the instant disclosure, the method may further include: simultaneously running each of the plurality of child desktops on the GUI window in parallel in a manner such that a user can toggle between the plurality of child desktops.

According to an additional aspect of the instant disclosure, each child desktop may correspond to an independent space within the GUI window independent of the primary desktop, and the method may further include dynamically creating the plurality of child desktops each associated with a corresponding independent space without requiring system privileges or changes.

According to yet another aspect of the instant disclosure, the method may further include implementing each independent space within the GUI window in a manner such that the user can continue to run the primary session on the primary desktop and toggle between the independent spaces to run corresponding child session.

According to yet another aspect of the instant disclosure, the method may further include running multiple instances of same robotic desktop automation robots (RDA bots) in the child desktop.

According to a further aspect of the instant disclosure, the method may further include only running allowed applications and actions programmed within attended automation in the child desktops; and restricting resource sharing between sessions, thereby eliminating any potential security risk, resource waste, and system performance issues.

According to another aspect of the instant disclosure, a system for implementing an attended automation module is disclosed. The system may include: a processor; and a memory operatively connected to the processor via a communication interface, the memory storing computer readable instructions, when executed, may cause the processor to: implement a primary desktop on a graphical user interface (GUI) window, wherein the primary desktop is created in response to calling a higher level API from a higher level library in connection with a primary desktop session; determine that a primary session is being conducted on the primary desktop; access, in response to determining that the primary session is being conducted on the primary desktop, a lower level library that stores lower level APIs; call the lower level APIs; dynamically create, in response to calling the lower level APIs, a plurality of child desktops each associated with a corresponding lower level API; display the plurality of child desktops on the GUI window; and simultaneously run each of the plurality of child desktops on the GUI window in parallel independent of running of the primary desktop.

According to yet another aspect of the instant disclosure, the processor may be further configured to simultaneously run each of the plurality of child desktops on the GUI window in parallel in a manner such that a user can toggle between the plurality of child desktops.

According to a further aspect of the instant disclosure, each child desktop may correspond to an independent space within the GUI window independent of the primary desktop, and the processor may be further configured to dynamically create the plurality of child desktops each associated with a corresponding independent space without requiring system privileges or changes. According to an aspect of the present disclosure, the method implemented by the system herein is configured for enabling automation without installation of any other components and change to system registries.

According to yet another aspect of the instant disclosure, the processor may be further configured to implement each independent space within the GUI window in a manner such that the user can continue to run the primary session on the primary desktop and toggle between the independent spaces to run corresponding child session.

According to a further aspect of the present disclosure, the processor may be further configured to run multiple instances of same robotic desktop automation robots (RDA bots) in the child desktop.

According to another aspect of the present disclosure, the processor may be further configured to only run allowed applications in the child desktops; and restrict resource sharing between sessions.

According to yet another aspect of the present disclosure, a non-transitory computer readable medium configured to store instructions for implementing an attended automation module is disclosed. The instructions, when executed, may cause a processor to perform the following: implementing a primary desktop on a graphical user interface (GUI) window, wherein the primary desktop is created in response to calling a higher level API from a higher level library in connection with a primary desktop session; determining that a primary session is being conducted on the primary desktop; accessing, in response to determining that the primary session is being conducted on the primary desktop, a lower level library that stores lower level APIs; calling the lower level APIs; dynamically creating, in response to calling the lower level APIs, a plurality of child desktops each associated with a corresponding lower level API; displaying the plurality of child desktops on the GUI window; and simultaneously running each of the plurality of child desktops on the GUI window in parallel independent of running of the primary desktop.

According to a further aspect of the instant disclosure, the instructions, when executed, may cause the processor to perform the following: simultaneously running each of the plurality of child desktops on the GUI window in parallel in a manner such that a user can toggle between the plurality of child desktops.

According to an additional aspect of the instant disclosure, each child desktop may correspond to an independent space within the GUI window independent of the primary desktop, and the instructions, when executed, may cause the processor to perform the following: dynamically creating the plurality of child desktops each associated with a corresponding independent space without requiring system privileges or changes.

According to yet another aspect of the instant disclosure, the instructions, when executed, may cause the processor to perform the following: implementing each independent space within the GUI window in a manner such that the user can continue to run the primary session on the primary desktop and toggle between the independent spaces to run corresponding child session.

According to yet another aspect of the instant disclosure, the instructions, when executed, may cause the processor to perform the following: running multiple instances of same robotic desktop automation robots (RDA bots) in the child desktop.

According to a further aspect of the instant disclosure, the instructions, when executed, may cause the processor to perform the following: only running allowed applications in the child desktops; and restricting resource sharing between sessions.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
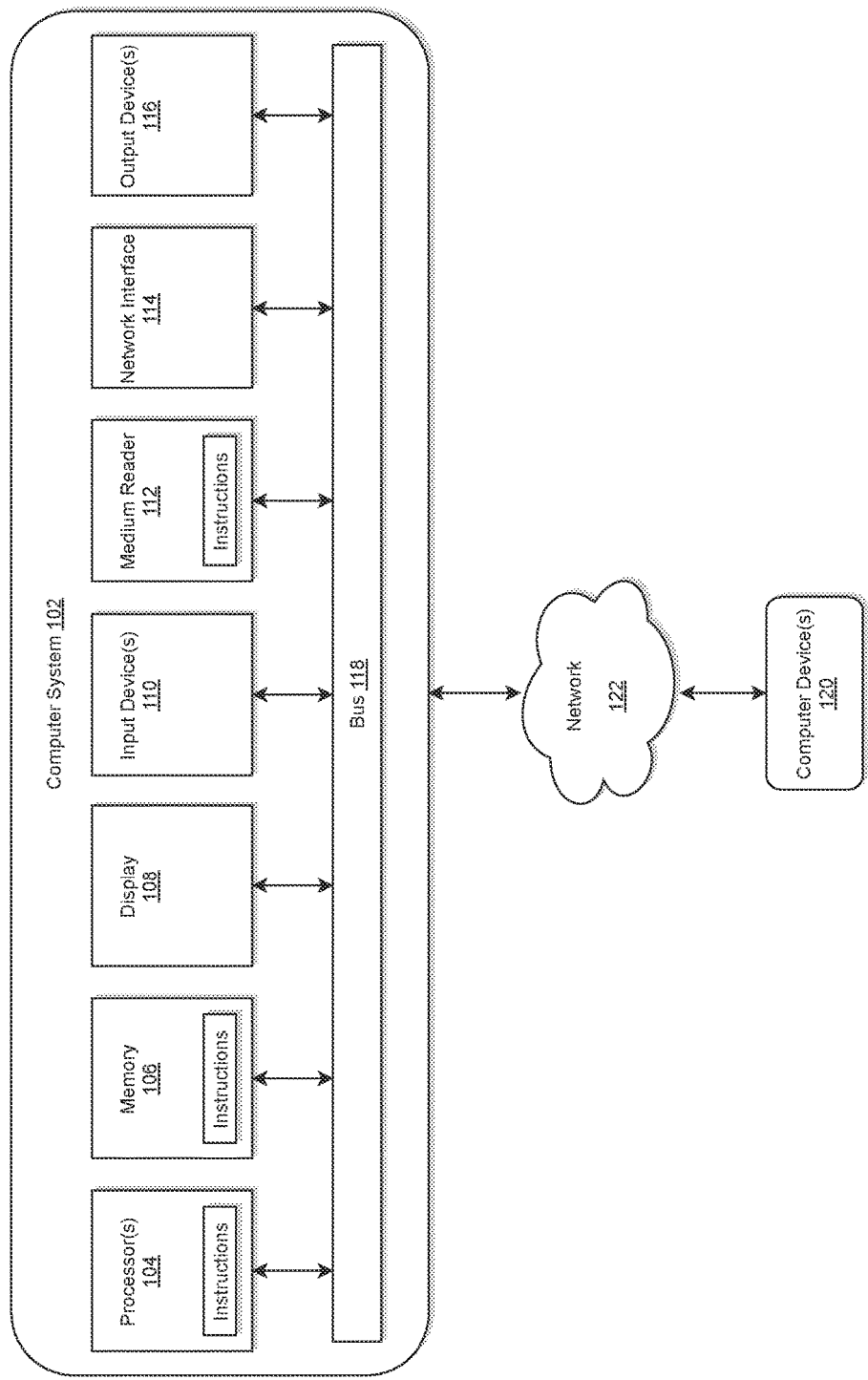
FIG. 1 illustrates a computer system for implementing an attended automation module for creating additional sessions (i.e., multiple child or secondary desktops) for running attended bots in parallel to their primary desktop in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in implementing an attended automation module for creating additional sessions (i.e., multiple child or secondary desktops) for running attended bots in parallel to their primary desktop in accordance with the embodiments described herein, but the disclosure is not limited thereto. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
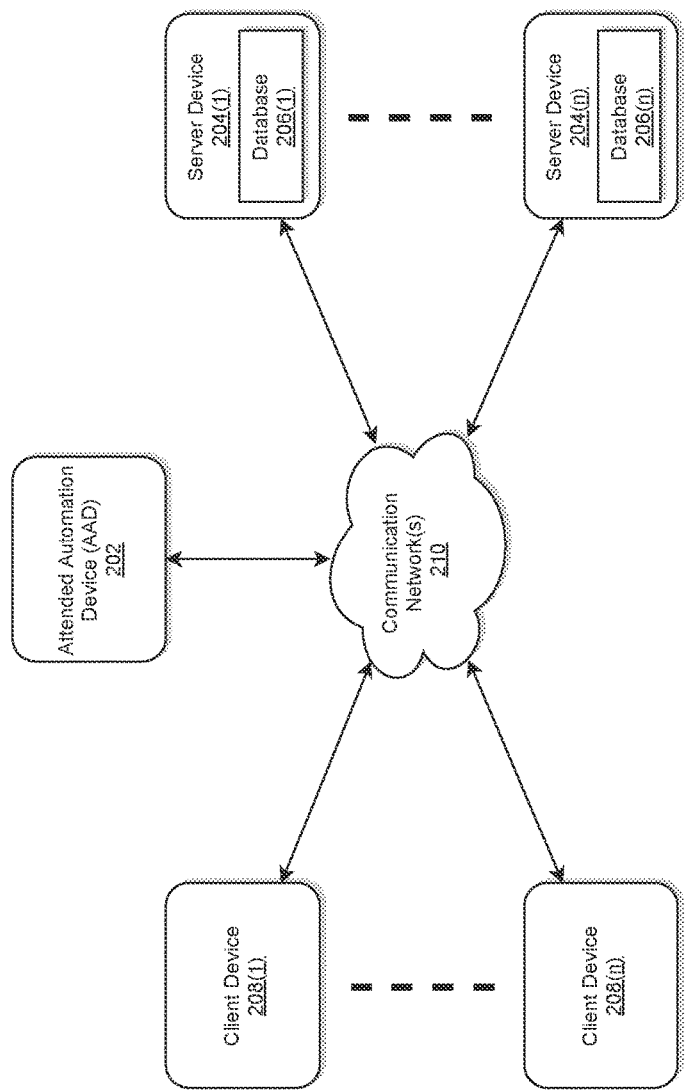
FIG. 2 illustrates an exemplary diagram of a network environment with an attended automation device in accordance with an exemplary embodiment.

Referring to FIG. 2, a schematic of an exemplary network environment 200 for implementing an attended automation device (AAD) of the instant disclosure is illustrated.

According to exemplary embodiments, the above-described problems associated with conventional approach of attended bots may be overcome by implementing a AAD 202 as illustrated in FIG. 2 that may create additional sessions (i.e., multiple child or secondary desktops) for running attended bots in parallel to their primary desktop without requiring system privileges or changes, but the disclosure is not limited thereto.

The AAD 202 may be the same or similar to the computer system 102 as described with respect to FIG. 1.

The AAD 202 may store one or more applications that can include executable instructions that, when executed by the AAD 202, cause the AAD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the AAD 202 itself, may be located in virtual server(s) running in a cloud-based computing environment rather than being tied to one or more specific physical network computing devices. Also, the application(s) may be running in one or more virtual machines (VMs) executing on the AAD 202. Additionally, in one or more embodiments of this technology, virtual machine(s) running on the AAD 202 may be managed or supervised by a hypervisor.

In the network environment 200 of FIG. 2, the AAD 202 is coupled to a plurality of server devices 204(1)-204(n) that hosts a plurality of databases 206(1)-206(n), and also to a plurality of client devices 208(1)-208(n) via communication network(s) 210. A communication interface of the AAD 202, such as the network interface 114 of the computer system 102 of FIG. 1, operatively couples and communicates between the AAD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the AAD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The AAD 202 may be a standalone device or integrated with one or more other devices or apparatuses, such as one or more of the server devices 204(1)-204(n), for example. In one particular example, the AAD 202 may be hosted by one of the server devices 204(1)-204(n), and other arrangements are also possible. Moreover, one or more of the devices of the AAD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the AAD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the AAD 202 that may efficiently provide a platform for additional sessions (i.e., multiple child or secondary desktops) for running attended bots in parallel to their primary desktop without requiring system privileges or changes, but the disclosure is not limited thereto.

The client devices 208(1)-208(n) may run interface applications, such as standard web browsers or standalone client applications, which may provide an interface to communicate with the AAD 202 via the communication network(s)

210 in order to communicate user requests. The client devices 208(1)-208(n) may further include, among other features, a display device, such as a display screen or touchscreen, and/or an input device, such as a keyboard, for example.

Although the exemplary network environment 200 with the AAD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the AAD 202, the server devices 204(1)-204(n), or the client devices 208(1)-208(n), for example, may be configured to operate as virtual instances on the same physical machine. For example, one or more of the AAD 202, the server devices 204(1)-204(n), or the client devices 208(1)-208(n) may operate on the same physical device rather than as separate devices communicating through communication network(s) 210. Additionally, there may be more or fewer AADs 202, server devices 204(1)-204(n), or client devices 208(1)-208(n) than illustrated in FIG. 2. According to exemplary embodiments, the AAD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
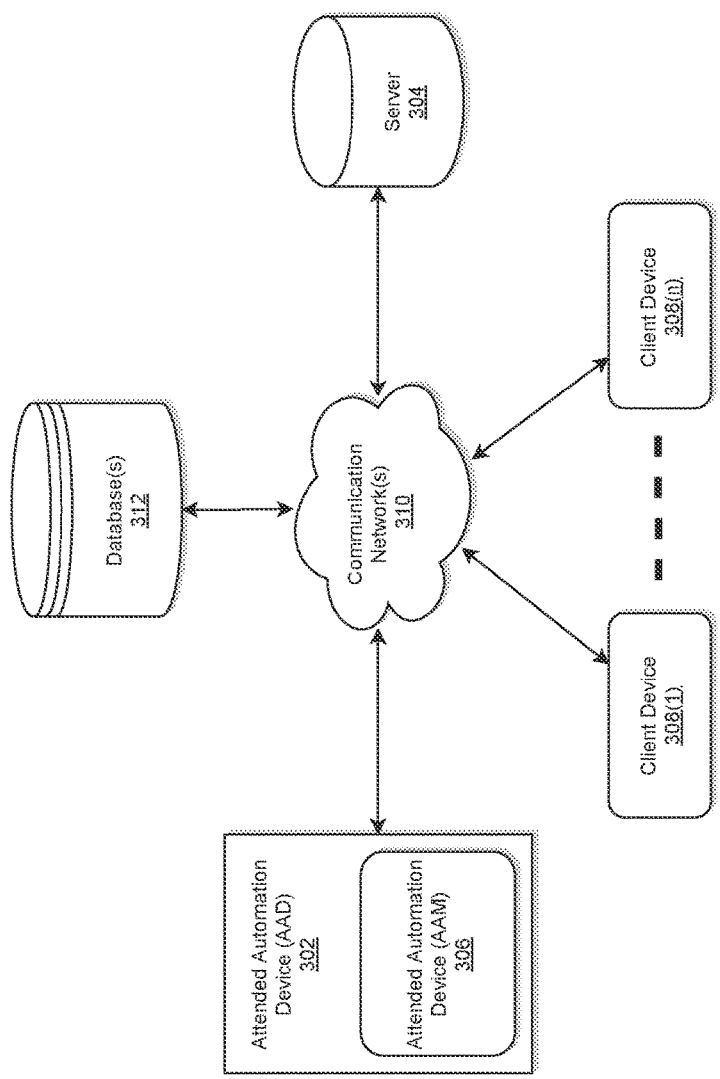
FIG. 3 illustrates a system diagram for an attended automation device having an attended automation module in accordance with an exemplary embodiment.

FIG. 3 illustrates a system diagram for implementing a platform and language agnostic attended automation device (AAD) having a platform and language agnostic attended automation module (AAM) in accordance with an exemplary embodiment.

As illustrated in FIG. 3, the system 300 may include an AAD 302 within which an AAM 306 is embedded, a server 304, a database(s) 312, a plurality of client devices 308(1) . . . 308(n), and a communication network 310. The database(s) 312 may be also referred to as a configuration and log database which may store higher level Windows APIs library and lower level Windows APIs library.

According to exemplary embodiments, the AAD 302 including the AAM 306 may be connected to the server 304, and the database(s) 312 via the communication network 310. The AAD 302 may also be connected to the plurality of client devices 308(1) . . . 308(n) via the communication network 310, but the disclosure is not limited thereto. The client devices 308(1) . . . 308(n) may be the same or similar to the client devices 208(1) . . . 208(n)

According to exemplary embodiment, the AAD 302 is described and shown in FIG. 3 as including the AAM 306, although it may include other rules, policies, modules, databases, or applications, for example. According to exemplary embodiments, the database(s) 312 may be configured to store ready to use modules written for each API for higher level and lower level for all environments corresponding to an application. Although only one database is illustrated in FIG. 3, the disclosure is not limited thereto. Any number of desired databases may be utilized for use in the disclosed invention herein.

According to exemplary embodiments, the AAM 306 may be configured to receive real-time feed of data from the plurality of client devices 308(1) . . . 308(n) via the communication network 310.

As will be described below, the AAM 306 may be configured to implement a primary desktop on a graphical user interface (GUI) window within the client devices 308(1) . . . 308(n), wherein the primary desktop may be created in response to calling a higher level API from a higher level library stored in the database(s) 312 in connection with a primary desktop session; determine that a primary session is being conducted on the primary desktop; access, in response to determining that the primary session is being conducted on the primary desktop, a lower level library that stores lower level APIs by accessing the database(s) 312; call the lower level APIs; dynamically create, in response to calling the lower level APIs, a plurality of child desktops each associated with a corresponding lower level API; display the plurality of child desktops on the GUI window within the client devices 308(1) . . . 308(n); and simultaneously run each of the plurality of child desktops on the GUI window in parallel independent of running of the primary desktop, but the disclosure is not limited thereto.

The plurality of client devices 308(1) . . . 308(n) are illustrated as being in communication with the AAD 302. In this regard, the plurality of client devices 308(1) . . . 308(n) may be "clients" of the AAD 302 and are described herein as such. Nevertheless, it is to be known and understood that the plurality of client devices 308(1) . . . 308(n) need not necessarily be "clients" of the AAD 302, or any entity described in association therewith herein. Any additional or alternative relationship may exist between either or both of the plurality of client devices 308(1) . . . 308(n) and the AAD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the AAD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The AAD 302 may be the same or similar to the AAD 202 as described with respect to FIG. 2, including any features or combination of features described with respect thereto.

Figure 4:
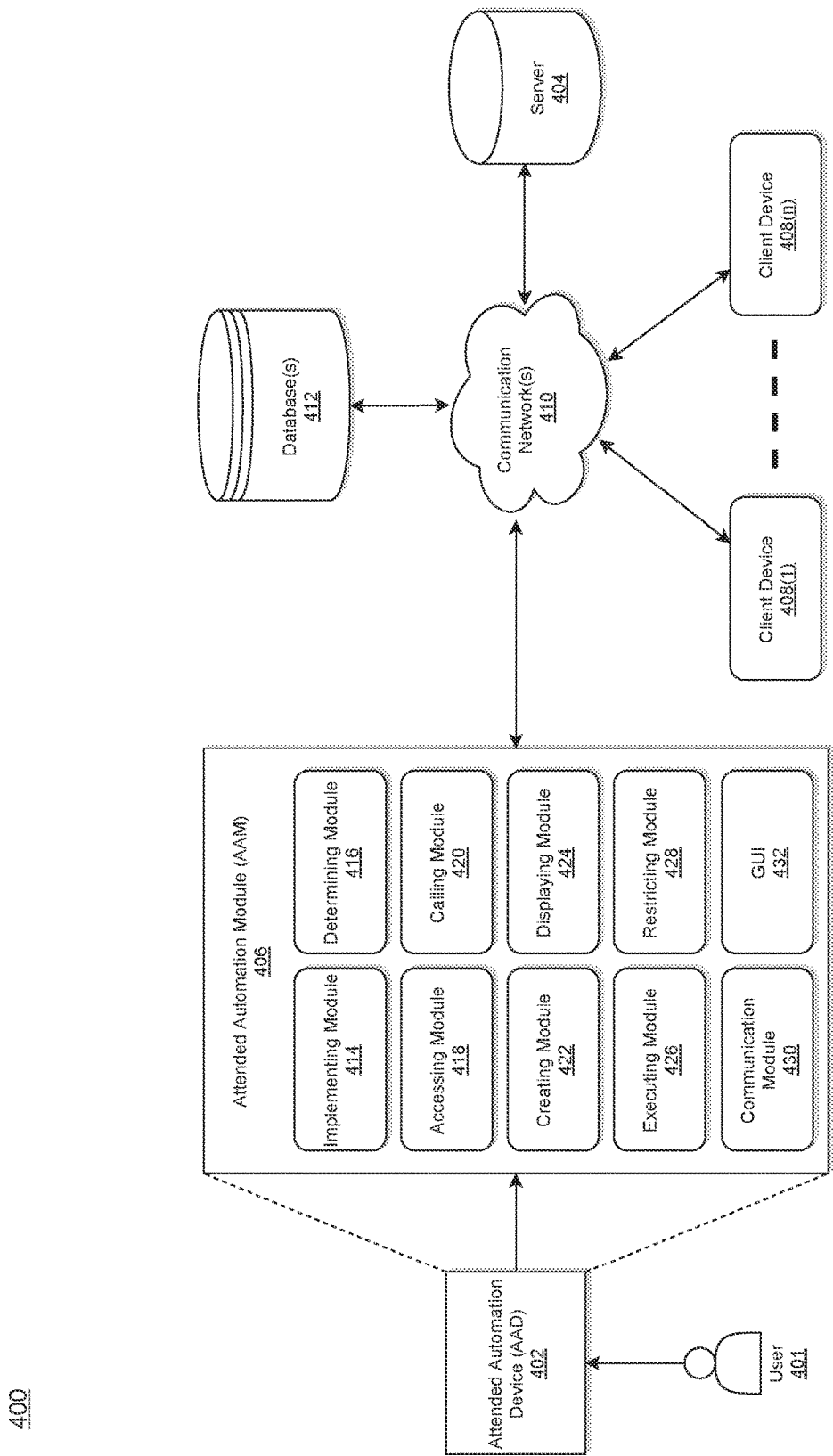
FIG. 4 illustrates a system diagram for implementing an attended automation module of FIG. 3 in accordance with an exemplary embodiment.

FIG. 4 illustrates a system diagram for implementing a platform and language agnostic attended automation module (AAM) of FIG. 3 in accordance with an exemplary embodiment.

According to exemplary embodiments, the system 400 may include a platform and language agnostic attended automation device (AAD) 402 within which an AAM 406 is embedded, a server 404, database(s) 412, and a communication network 410.

According to exemplary embodiments, the AAD 402 including the AAM 406 may be connected to the server 404 and the database(s) 412 via the communication network 410. The AAD 402 may also be connected to the plurality of client devices 408(1)-408(n) via the communication network 410, but the disclosure is not limited thereto. The AAM 406, the server 404, the plurality of client devices 408(1)-408(n), the database(s) 412, the communication network 410 as illustrated in FIG. 4 may be the same or similar to the AAM 306, the server 304, the plurality of client devices 308(1)-308(n), the database(s) 312, the communication network 310, respectively, as illustrated in FIG. 3.

According to exemplary embodiments, as illustrated in FIG. 4, the AAM 406 may include an implementing module 414, a determining module 416, an accessing module 418, a calling module 420, a creating module 422, a display module 424, an executing module 426, a restricting module 428, a communication module 430, and a GUI 432.

According to exemplary embodiments, each of the implementing module 414, determining module 416, accessing module 418, calling module 420, creating module 422, display module 424, executing module 426, restricting module 428, and the communication module 430 of the AAM 406 as illustrated in FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the implementing module 414, determining module 416, accessing module 418, calling module 420, creating module 422, display module 424, executing module 426, restricting module 428, and the communication module 430 of the AAM 406 as illustrated in FIG. 4 may be implemented by microprocessors or similar, and may be programmed using software (e.g., microcode) to perform various functions discussed herein and may optionally be driven by firmware and/or software.

Alternatively, according to exemplary embodiments, each of the implementing module 414, determining module 416, accessing module 418, calling module 420, creating module 422, display module 424, executing module 426, restricting module 428, and the communication module 430 of the AAM 406 as illustrated in FIG. 4 may be implemented by dedicated hardware, or as a combination of dedicated hardware to perform some functions and a processor (e.g., one or more programmed microprocessors and associated circuitry) to perform other functions.

According to exemplary embodiments, each of the implementing module 414, determining module 416, accessing module 418, calling module 420, creating module 422, display module 424, executing module 426, restricting module 428, and the communication module 430 of the AAM 406 as illustrated in FIG. 4 may be called via corresponding API.

The process may be executed via the communication module 430 and the communication network 410, which may comprise plural networks as described above. For example, in an exemplary embodiment, the various components of the AAM 406 may communicate with the server 404, and the database(s) 412 via the communication module 430 and the communication network 410. Of course, these embodiments are merely exemplary and are not limiting or exhaustive.

According to exemplary embodiments, the communication network 410 and the communication module 430 may be configured to establish a link between the database(s) 412, the client devices 408(1)-408(n) and the AAM 406.

Figure 5:
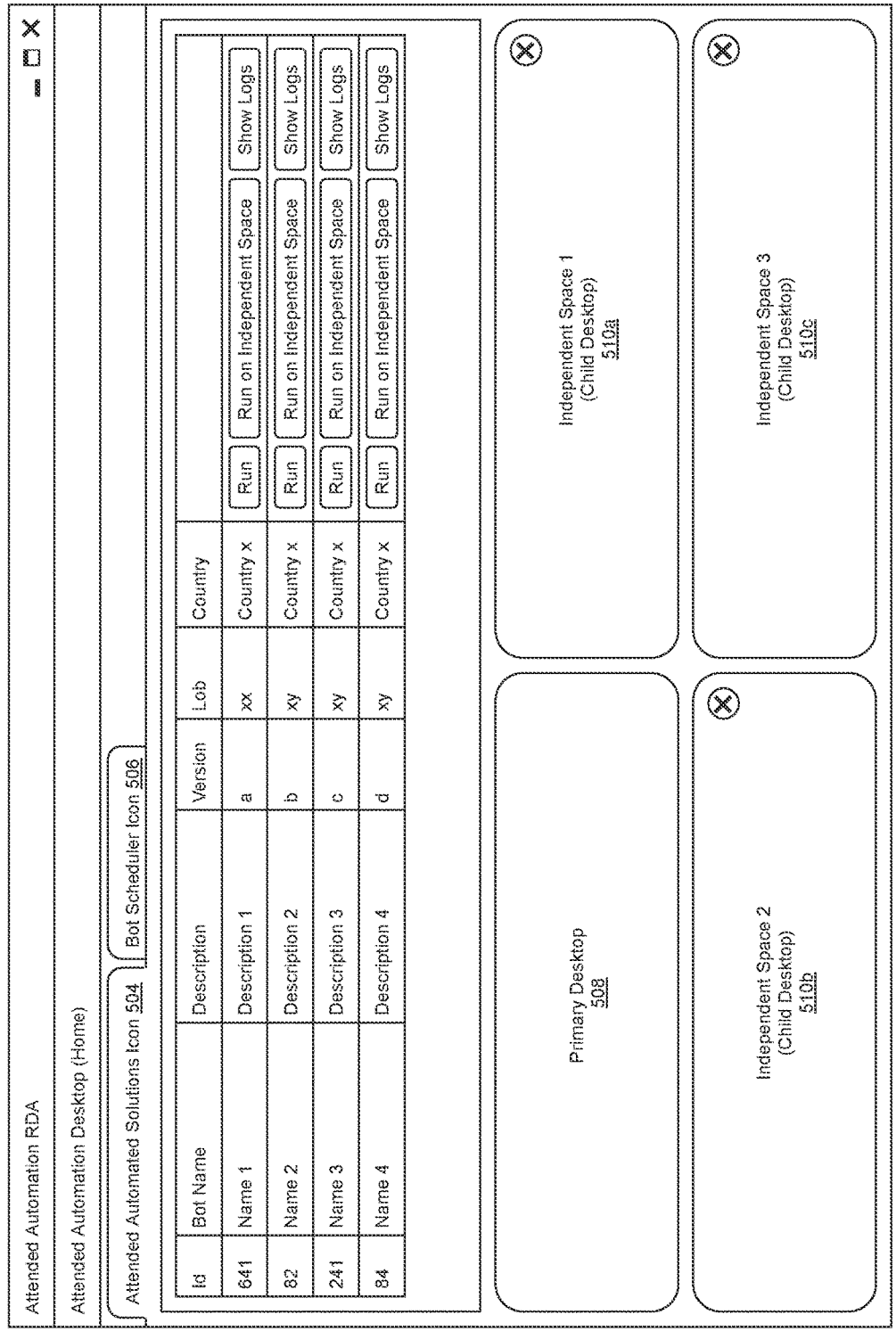
FIG. 5 illustrates an exemplary screen shot implemented by the attended automation module of FIG. 4 in accordance with an exemplary embodiment.

According to exemplary embodiments, FIG. 5 illustrates an exemplary screen shot 500 that illustrates a GUI window 502 implemented by the AAM 406 of FIG. 4 in accordance with an exemplary embodiment. The GUI window 502 may be implemented by the GUI 432 of FIG. 4.

As illustrated in FIG. 5, the GUI window 502 may include an attended automation solutions icon 504, a bot scheduler icon 506, but the disclosure is not limited thereto. The GUI window 502 also illustrates a primary desktop 508, and a plurality of child desktops 510a, 510b, and 510c. These child desktops 510a, 510b, and 510c may also be referred to as independent space 1, independent space 2, and independent space 3, respectively.

Referring to FIGS. 4-5, according to exemplary embodiments, the implementing module 414 may be configured to implementing a primary desktop 508 on a GUI window 502. The primary desktop 508 may be created in response to calling a higher level application programming interface (API) from a higher level library in connection with a primary desktop session.

According to exemplary embodiments, the determining module 416 may be configured to determine that a primary session is being conducted on the primary desktop 508. The accessing module 418 may be configured to access, in response to determining that the primary session is being conducted on the primary desktop 508, a lower level library that stores lower level APIs.

According to exemplary embodiments, the calling module 420 may be configured to call the lower level APIs; and the creating module 422 may be configured to dynamically create, in response to calling the lower level APIs by the calling module 420, a plurality of child desktops 510a, 510b, 510c each associated with a corresponding lower level API.

According to exemplary embodiments, the display module 424 may be configured to display the plurality of child desktops 510a, 510b, 510c on the GUI window 502; and the executing module 426 may be configured to simultaneously run each of the plurality of child desktops on the GUI window 502 in parallel, independent of running of the primary desktop 508.

According to exemplary embodiments, the higher level library and the lower level library may correspond to system level application access, and wherein a lower level API may include more detailed functionalities corresponding to an application compared to a higher level API.

According to exemplary embodiments, the executing module 426 may be further configured to simultaneously run each of the plurality of child desktops 510a, 510b, 510c on the GUI window 502 in parallel in a manner such that a user 401 can toggle between the plurality of child desktops 510a, 510b, 510c.

According to exemplary embodiments, each child desktop may correspond to an independent space within the GUI window 502 independent of the primary desktop 508, and the creating module 422 may be configured to dynamically create the plurality of child desktops 510a, 510b, 510c, each associated with a corresponding independent space without requiring system privileges or changes.

According to exemplary embodiments, the implementing module 414 may be configured to implement each independent space within the GUI window 502 in a manner such that the user 401 can continue to run the primary session on the primary desktop 508 and toggle between the independent spaces to run corresponding child session.

According to exemplary embodiments, the executing module 426 may be configured to run multiple instances of same robotic desktop automation robots (RDA bots) in the child desktop 510*a*, or 510*b*, or 510*c*.

According to exemplary embodiments, the executing module 426 may be configured to only run allowed applications in the child desktops 510*a*, 510*b*, 510*c*; and the restricting module 428 may be configured to restrict resource sharing between sessions.

For example, referring back to FIGS. 4-5, according to exemplary embodiments, when a user 401 launches attended automation RDA application (i.e., the AAM 406), the attended automation RDA application may automatically create an independent space 1 (i.e., child or secondary desktop 510*a*), an independent space 2 (i.e., child or secondary desktop 510*b*), and an independent space 3 (i.e., child or secondary desktop 510*c*) by calling corresponding lower level API independent of the primary desktop 508, thereby allowing the user 401 to run attended bots in one or more desired independent spaces. According to exemplary embodiments, the AAM 406 may be configured to automatically create the independent spaces (child or secondary desktops 510*a*, 510*b*, 510*c*) in a manner such that users 401 can continue to run a session on the primary desktop 508 and toggle between the independent spaces (child or secondary desktops 510*a*, 510*b*, 510*c*).

According to exemplary embodiments, Windows low level APIs may include USer 32, Kernel, gdi32, etc., but the disclosure is not limited thereto.

According to exemplary embodiments, the AAM 406 may be further configured to implement multiple the independent spaces (child or secondary desktops 510*a*, 510*b*, 510*c*) in a manner such that more than one bot can run in parallel while users 401 are working; execute image based, Citrix, Desktop, and Adobe Flash based automations without disruption to user activities; provide flexibility to handle up to three, but the disclosure is not limited to three, robotic desktop automation (RDA) bots at a time on a single user machine; enable integration and execution of other automation scripts/tools with RDA bots, etc., but the disclosure is not limited thereto.

For example, when user input is received via the attended automation solutions icon 504, the GUI window 502 may automatically display identifiers for a specific bot, bot name, description, version, line-of-business, country information, etc., and may automatically present additional selectable corresponding icon of running a session on the primary desktop 508, running a session on the multiple child or secondary desktops 510*a*, 510*b*, 510*c*, etc., but the disclosure is not limited thereto. For example, as illustrated in FIG. 5, bot 82 is running on the child desktop 510*a*, primary session is running on the primary desktop 508, and child desktop 510*c* may be available to run other bots. According to exemplary embodiments, the AAM 406 may create four independent spaces to run attended automation specific bots/tools, but the disclosure is not limited thereto.

Figure 6:
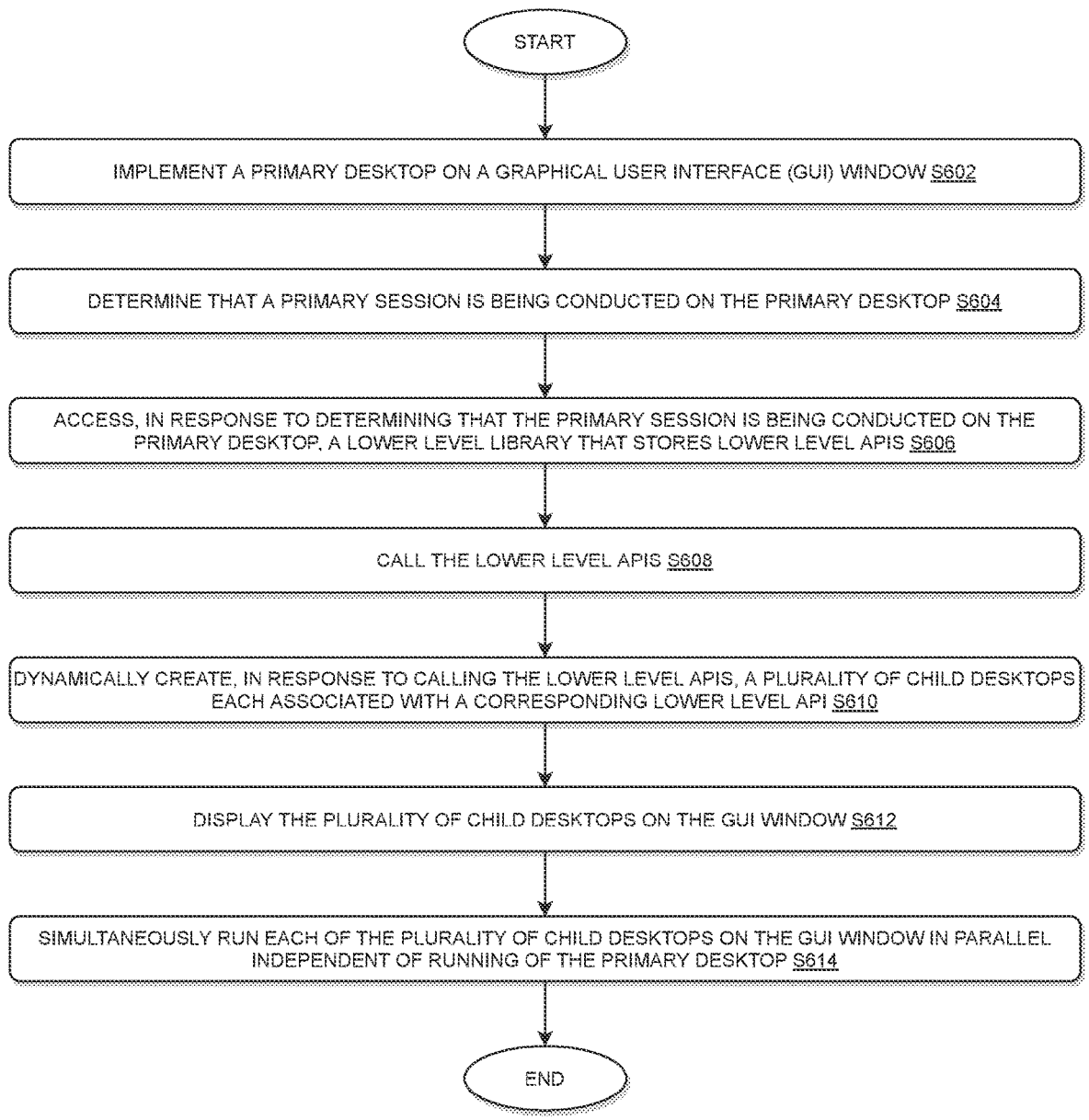
FIG. 6 illustrates a flow chart of a process implemented by the attended automation module of FIG. 4 in accordance with an exemplary embodiment.

FIG. 6 illustrates a flow chart of a process 600 for implementing the AAM 406 that provides a platform for creating additional sessions (i.e., multiple child or secondary desktops) for running attended bots in parallel to their primary desktop in accordance with an exemplary embodiment. It will be appreciated that the illustrated process 600 and associated steps may be performed in a different order, with illustrated steps omitted, with additional steps added, or with a combination of reordered, combined, omitted, or additional steps.

As illustrated in FIG. 6, at step S602, the process 600 may include implementing a primary desktop on a GUI window. The primary desktop may be created in response to calling a higher level application programming interface (API) from a higher level library in connection with a primary desktop session.

At step S604, the process 600 may include determining that a primary session is being conducted on the primary desktop.

At step S606, the process 600 may include accessing, in response to determining that the primary session is being conducted on the primary desktop, a lower level library that stores lower level APIs.

At step S608, the process 600 may include calling the lower level APIs.

At step S610, the process 600 may include dynamically creating, in response to calling the lower level APIs, a plurality of child desktops each associated with a corresponding lower level API.

At step S612, the process 600 may include displaying the plurality of child desktops on the GUI window.

At step S614, the process 600 may include simultaneously running each of the plurality of child desktops on the GUI window in parallel independent of running of the primary desktop.

According to exemplary embodiments, the process 600 may further include simultaneously running each of the plurality of child desktops on the GUI window in parallel in a manner such that a user can toggle between the plurality of child desktops.

According to exemplary embodiments, each child desktop may correspond to an independent space within the GUI window independent of the primary desktop, and the process 600 may further include dynamically creating the plurality of child desktops each associated with a corresponding independent space without requiring system privileges or changes.

According to exemplary embodiments, the process 600 may further include implementing each independent space within the GUI window in a manner such that the user can continue to run the primary session on the primary desktop and toggle between the independent spaces to run corresponding child session.

According to exemplary embodiments, the process 600 may further include running multiple instances of same robotic desktop automation robots (RDA bots) in the child desktop.

According to exemplary embodiments, the process 600 may further include only running allowed applications in the child desktops; and restricting resource sharing between sessions.

Figure 7:
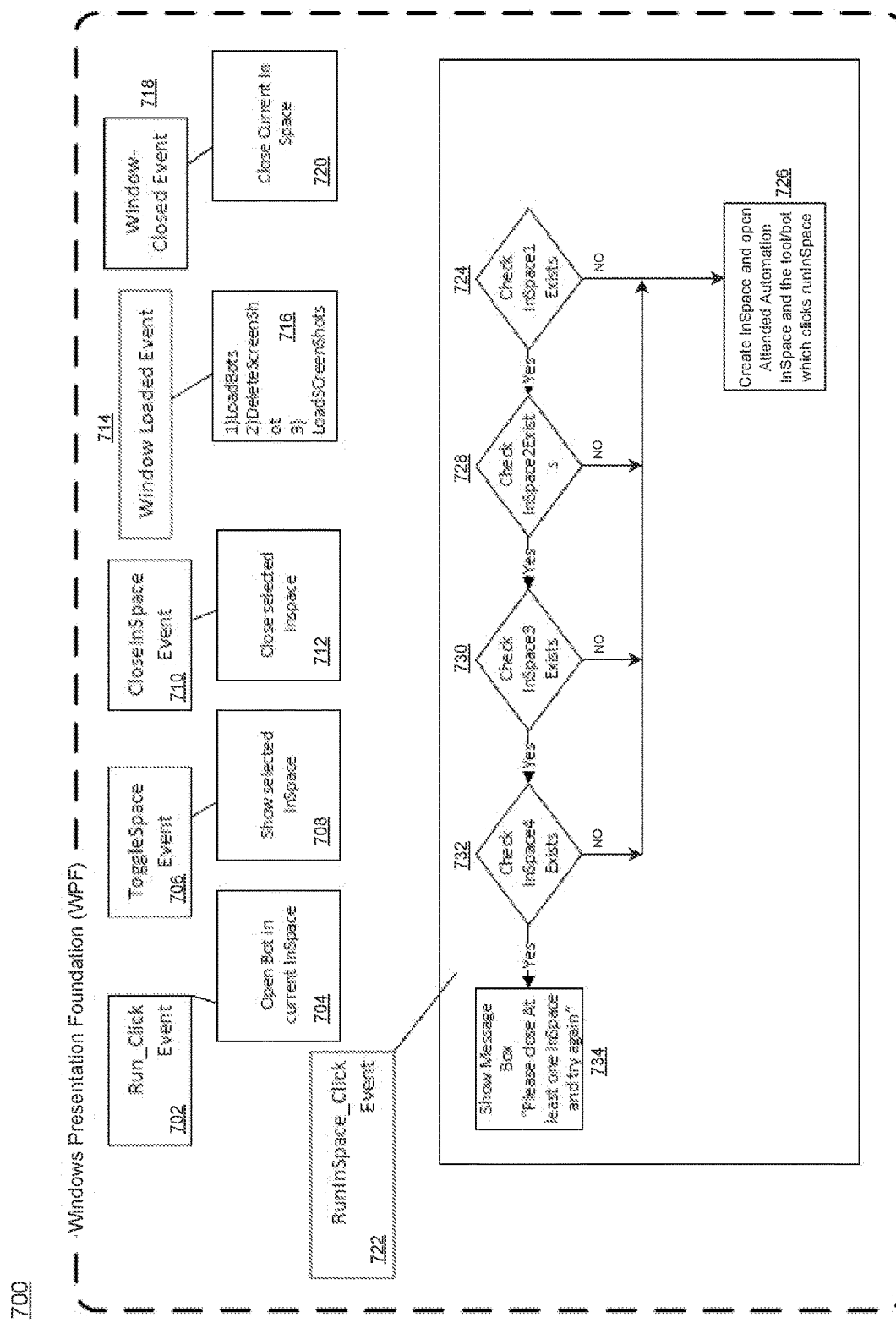
FIG. 7 illustrates an exemplary class or library diagram implemented by the attended automation module of FIG. 4 in accordance with an exemplary embodiment.

FIG. 7 illustrates an exemplary class or library diagram 700 implemented by the AAM 406 of FIG. 4 in accordance with an exemplary embodiment. According to exemplary embodiments, the class or library diagram 700 illustrates a run click event 702 that opens a bot in a current independent space 704 (i.e., child desktop); a toggle space event 706 that shows selected independent space 708; a close independent space event 710 that closes the selected independent space 712; a window loaded event 714 that implements the following processes 716: loads bots; deletes screen shot; loads screen shots, etc., but the disclosure is not limited thereto; a window-closed event 718 that closes the current independent space 720; and a run independent space_click event 722 that implements steps 724, 726, 728, 730, 732 and 734.

Referring back to FIGS. 4, 5, and 7, according to exemplary use case, at step 724, the process implemented by the AAM 406 in the run independent space_click event 722 may check whether independent space 1 (i.e., element 510a in FIG. 5) exists or not. If it is determined in step 724 that independent space 1 does not exist, the process flows to step 726 for creating independent space and opening attended automation independent space and the tool/bot which clicks a "run independent space" icon (not shown). However, if it is determined in step 724 that independent space 1 exists, at step 728 it is determined whether independent space 2 (i.e., element 510b in FIG. 5) exists or not. If it is determined in step 728 that independent space 2 does not exist, the process flows to step 726 for creating independent space and opening attended automation independent space and the tool/bot which clicks a "run independent space" icon as disclosed above. However, if it is determined in step 728 that independent space 2 exists, at step 730 it is determined whether independent space 3 (i.e., element 510c in FIG. 5) exists or not. If it is determined in step 730 that independent space 3 does not exist, the process flows to step 726 for creating independent space and opening attended automation independent space and the tool/bot which clicks a "run independent space" icon as disclosed above. However, if it is determined in step 730 that independent space 3 exists, at step 732 it is determined whether independent space 4 exists or not. If it is determined in step 732 that independent space 4 does not exist, the process flows to step 726 for creating independent space and opening attended automation independent space and the tool/bot which clicks a "run independent space" icon as disclosed above. However, if it is determined in step 732 that independent space 4 exists, in step 734, a message box may be displayed on the GUI 432 showing "please close at least one independent space and try again," but the disclosure is not limited thereto.

Figure 8:
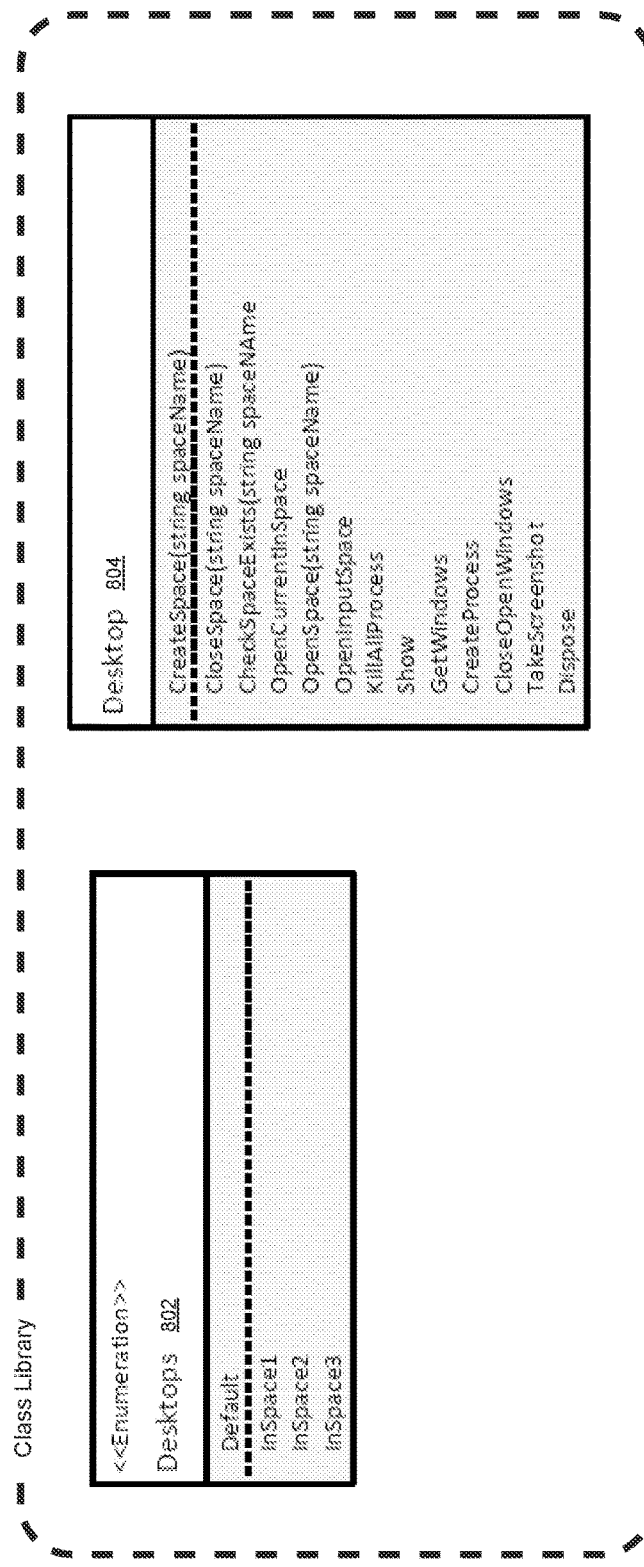
FIG. 8 illustrates exemplary reusable functions implemented by the attended automation module of FIG. 4 using Windows APIs in accordance with an exemplary embodiment.

FIG. 8 illustrates an exemplary desktop library (i.e., class library) 800 that illustrates reusable functions implemented by the attended automation module of FIG. 4 using Windows APIs in accordance with an exemplary embodiment. For example, enumeration desktops 802 may include independent space 1, independent space 2, and independent space 3 as default. Desktop 804 may include "CreateSpace (string spaceName)" class that may include various classes as listed under the "CreateSpace(string spaceName)" class, but the disclosure is not limited thereto.

According to exemplary embodiments, the AAD 402 may include a memory (e.g., a memory 106 as illustrated in FIG. 1) which may be a non-transitory computer readable medium that may be configured to store instructions for implementing the AAM 406 that provides a platform for creating additional sessions (i.e., multiple child or secondary desktops) for running attended bots in parallel to their primary desktop as disclosed herein. The AAD 402 may also include a medium reader (e.g., a medium reader 112 as illustrated in FIG. 1) which may be configured to read any one or more sets of instructions, e.g., software, from any of the memories described herein. The instructions, when executed by a processor embedded within the AAM 406, or within the AAD 402, may be used to perform one or more of the methods and processes as described herein. In a particular embodiment, the instructions may reside completely, or at least partially, within the memory 106, the medium reader 112, and/or the processor 104 (see FIG. 1) during execution by the AAD 402.

According to exemplary embodiments, the instructions, when executed, may cause a processor embedded within the AAM 406, or the AAD 402 to perform the following: implementing a primary desktop on a graphical user interface (GUI) window, wherein the primary desktop is created in response to calling a higher level application programming interface (API) from a higher level library in connection with a primary desktop session; determining that a primary session is being conducted on the primary desktop; accessing, in response to determining that the primary session is being conducted on the primary desktop, a lower level library that stores lower level APIs; calling the lower level APIs; dynamically creating, in response to calling the lower level APIs, a plurality of child desktops each associated with a corresponding lower level API; displaying the plurality of child desktops on the GUI window; and simultaneously running each of the plurality of child desktops on the GUI window in parallel independent of running of the primary desktop. The processor may be the same or similar to the processor 104 as illustrated in FIG. 1 or the processor embedded within AAD 202, AAD 302, AAD 402, and the AAM 406.

According to exemplary embodiments, the instructions, when executed, may cause the processor 104 to perform the following: simultaneously running each of the plurality of child desktops on the GUI window in parallel in a manner such that a user can toggle between the plurality of child desktops.

According to exemplary embodiments, each child desktop may correspond to an independent space within the GUI window independent of the primary desktop, and the instructions, when executed, may cause the processor 104 to perform the following: dynamically creating the plurality of child desktops each associated with a corresponding independent space without requiring system privileges or changes.

According to exemplary embodiments, the instructions, when executed, may cause the processor 104 to perform the following: implementing each independent space within the GUI window in a manner such that the user can continue to run the primary session on the primary desktop and toggle between the independent spaces to run corresponding child session.

According to exemplary embodiments, the instructions, when executed, may cause the processor 104 to perform the following: running multiple instances of same robotic desktop automation robots (RDA bots) in the child desktop.

According to exemplary embodiments, the instructions, when executed, may cause the processor 104 to perform the following: only running allowed applications in the child desktops; and restricting resource sharing between sessions.

According to exemplary embodiments as disclosed above in FIGS. 1-6, technical improvements effected by the instant disclosure may include a platform for implementing a platform and language agnostic attended automation module configured for creating additional sessions (i.e., multiple child or secondary desktops) for running attended bots in parallel to their primary desktop without requiring system privileges or changes, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing an attended automation module by utilizing one or more processors and one or more memories, the method comprising:

implementing a primary desktop on a graphical user interface (GUI) window, wherein the primary desktop is created in response to calling a higher level application programming interface (API) from a higher level library in connection with a primary desktop session;

determining that a primary session is being conducted on the primary desktop;

accessing, in response to determining that the primary session is being conducted on the primary desktop, a lower level library that stores lower level APIs;

calling the lower level APIs;

dynamically creating, in response to calling the lower level APIs, a plurality of child desktops each associated with a corresponding lower level API;

displaying the plurality of child desktops on the GUI window;

simultaneously running each of the plurality of child desktops on the GUI window in parallel and independent of running of a user session on the primary desktop, wherein each child desktop corresponds to an independent space within the GUI window independent of the primary desktop;

dynamically creating the plurality of child desktops each associated with a corresponding independent space without requiring system privileges or changes;

running a plurality of robots in parallel on the plurality of child desktops while a user is working in the primary session on the primary desktop; and enabling, by the running of the plurality of robots, automation of actions requiring user application focus via at least one of screen based actions, mouse control, and keyboard actions, wherein the automation is enabled without performing at least one of installing another component and changing a system registry.

2. The method according to claim 1, wherein the higher level library and the lower level library correspond to system level application access, and wherein a lower level API includes more detailed functionalities corresponding to an application compared to a higher level API.

3. The method according to claim 1, further comprising:
simultaneously running each of the plurality of child desktops on the GUI window in parallel in a manner such that a user can toggle between the plurality of child desktops.

4. The method according to claim 1, further comprising:
implementing each independent space within the GUI window in a manner such that the user can continue to run the primary session on the primary desktop and toggle between the independent spaces to run corresponding child session.

5. The method according to claim 1, further comprising:
running multiple instances of same robotic desktop automation robots (RDA bots) in the child desktop, wherein the plurality of robots comprises the RDA bots.

6. The method according to claim 1, further comprising:
only running allowed applications in the child desktops; and
restricting resource sharing between sessions.

7. A system for implementing an attended automation module, the system comprising:
a processor; and
a memory operatively connected to the processor via a communication interface, the memory storing computer readable instructions that, when executed, cause the processor to:
implement a primary desktop on a graphical user interface (GUI) window, wherein the primary desktop is created in response to calling a higher level application programming interface (API) from a higher level library in connection with a primary desktop session;
determine that a primary session is being conducted on the primary desktop;
access, in response to determining that the primary session is being conducted on the primary desktop, a lower level library that stores lower level APIs;
call the lower level APIs;
dynamically create, in response to calling the lower level APIs, a plurality of child desktops each associated with a corresponding lower level API;
display the plurality of child desktops on the GUI window;
simultaneously run each of the plurality of child desktops on the GUI window in parallel and independent of running of a user session on the primary desktop, wherein each child desktop corresponds to an independent space within the GUI window independent of the primary desktop;

dynamically create the plurality of child desktops each associated with a corresponding independent space without requiring system privileges or changes;

running a plurality of robots in parallel on the plurality of child desktops while a user is working in the primary session on the primary desktop; and enabling, by the running of the plurality of robots, automation of actions requiring user application focus via at least one of screen based actions, mouse control, and keyboard actions, wherein the automation is enabled without performing at least one of installing another component and changing a system registry.

8. The system according to claim 7, wherein the higher level library and the lower level library correspond to system level application access, and wherein a lower level API includes more detailed functionalities corresponding to an application compared to a higher level API.

9. The system according to claim 7, wherein the processor is further configured to:
simultaneously run each of the plurality of child desktops on the GUI window in parallel in a manner such that a user can toggle between the plurality of child desktops.

10. The system according to claim 7, wherein the processor is further configured to:
implement each independent space within the GUI window in a manner such that the user can continue to run the primary session on the primary desktop and toggle between the independent spaces to run corresponding child session.

11. The system according to claim 7, wherein the processor is further configured to:
run multiple instances of same robotic desktop automation robots (RDA bots) in the child desktop, wherein the plurality of robots comprises the RDA bots.

12. The system according to claim 7, wherein the processor is further configured to:
only run allowed applications in the child desktops; and
restrict resource sharing between sessions.

13. A non-transitory computer readable medium configured to store instructions for implementing an attended automation module, wherein, when executed, the instructions cause a processor to implement a primary desktop on a graphical user interface (GUI) window, wherein the primary desktop is created in response to calling a higher level application programming interface (API) from a higher level library in connection with a primary desktop session;
determine that a primary session is being conducted on the primary desktop;
access, in response to determining that the primary session is being conducted on the primary desktop, a lower level library that stores lower level APIs;
call the lower level APIs;
dynamically create, in response to calling the lower level APIs, a plurality of child desktops each associated with a corresponding lower level API;
display the plurality of child desktops on the GUI window;
simultaneously run each of the plurality of child desktops on the GUI window in parallel and independent of running of a user session on the primary desktop, wherein each child desktop corresponds to an independent space within the GUI window independent of the primary desktop;

dynamically create the plurality of child desktops each associated with a corresponding independent space without requiring system privileges or changes;

run a plurality of robots in parallel on the plurality of child desktops while a user is working in the primary session on the primary desktop; and enable, by the running of the plurality of robots, automation of actions requiring user application focus via at least one of screen based actions, mouse control, and keyboard actions, wherein the automation is enabled without performing at least one of installing another component and changing a system registry.

14. The non-transitory computer readable medium according to claim 13, wherein the higher level library and the lower level library correspond to system level application access, and wherein a lower level API includes more detailed functionalities corresponding to an application compared to a higher level API.

15. The non-transitory computer readable medium according to claim 13, wherein, the instructions, when executed, further cause the processor to:

simultaneously run each of the plurality of child desktops on the GUI window in parallel in a manner such that a user can toggle between the plurality of child desktops.

16. The non-transitory computer readable medium according to claim 13, wherein the instructions, when executed, further cause the processor to:

implement each independent space within the GUI window in a manner such that the user can continue to run the primary session on the primary desktop and toggle between the independent spaces to run corresponding child session.

17. The non-transitory computer readable medium according to claim 13, wherein the instructions, when executed, further cause the processor to:

run multiple instances of same robotic desktop automation robots (RDA bots) in the child desktop, wherein the plurality of robots comprises the RDA bots.

18. The non-transitory computer readable medium according to claim 13, wherein the instructions, when executed, further cause the processor to:

only run allowed applications in the child desktops; and restrict resource sharing between sessions.

\* \* \* \* \*